(No Model.)  2 Sheets—Sheet 1.

C. V. OSBORN.
CONDUIT FOR ELECTRIC RAILWAYS.

No. 597,508. Patented Jan. 18, 1898.

WITNESSES
George Heidman
Harvey Edwards

INVENTOR
Cyrus V. Osborn
by Arthur Shinn
atty.

THE NORRIS PETERS CO., PHOTO-LITHO., WASHINGTON, D. C.

(No Model.) 2 Sheets—Sheet 2.

C. V. OSBORN.
CONDUIT FOR ELECTRIC RAILWAYS.

No. 597,508. Patented Jan. 18, 1898.

WITNESSES
George Heidman
Harvey Edwards

INVENTOR
Cyrus V. Osborn
By Arthur Stem
Atty.

UNITED STATES PATENT OFFICE.

CYRUS V. OSBORN, OF DAYTON, OHIO.

CONDUIT FOR ELECTRIC RAILWAYS.

SPECIFICATION forming part of Letters Patent No. 597,508, dated January 18, 1898.

Application filed July 18, 1896. Serial No. 599,628. (No model.)

*To all whom it may concern:*

Be it known that I, CYRUS V. OSBORN, a citizen of the United States, residing at Dayton, in the county of Montgomery and State of Ohio, have invented certain new and useful Improvements in Electric Conduits, of which the following is a full, clear, and exact description, reference being had to the accompanying drawings, forming part of this specification.

My invention relates to an improvement in electric conduits for conveying the electric current for use on railway-lines and is designed to provide a subsurface conduit which can be effectively insulated and drained and kept constantly free and clean from dirt or other impediments, is always easily and readily reached from any point on the surface, and is adapted to be arranged to convey currents of electricity for the use of two lines or tracks carrying cars or trains in the same or in opposite directions.

The various features of my improvement will be more fully hereinafter set forth.

Figure 1:
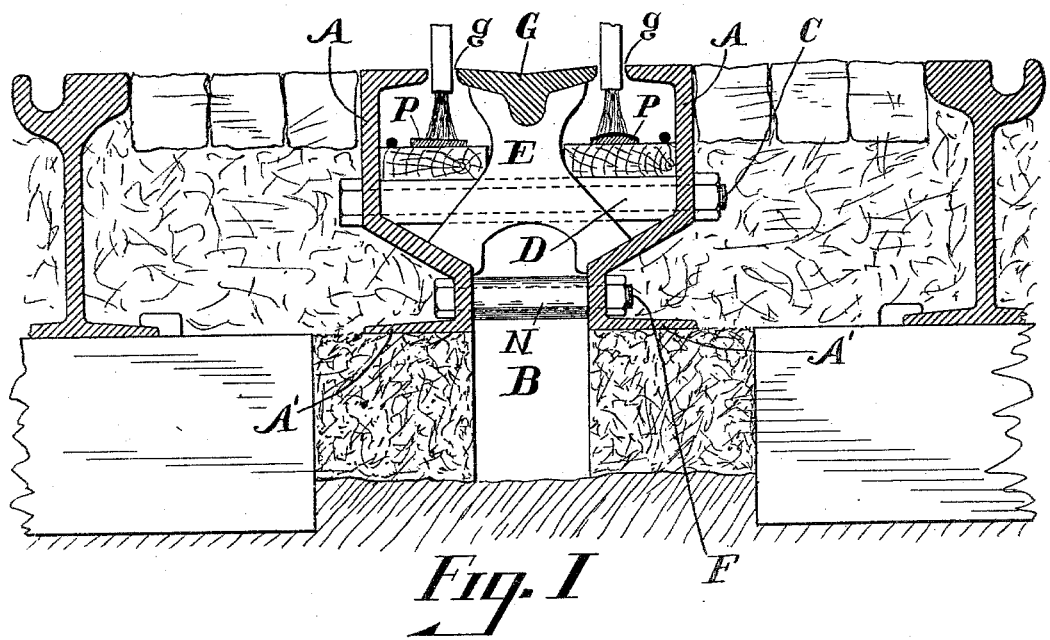
Figure 2:
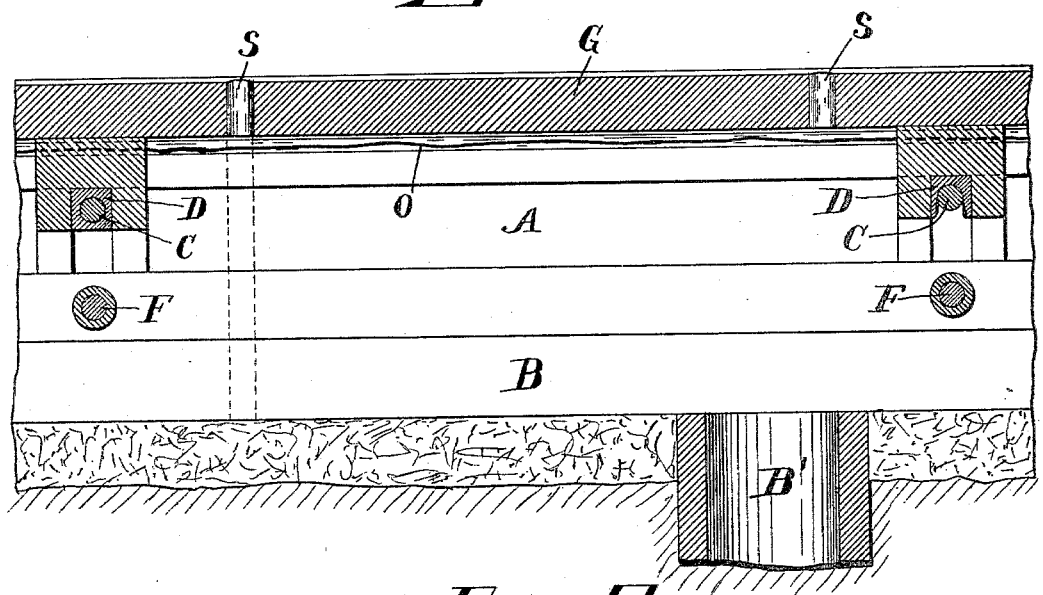
Figure 3:
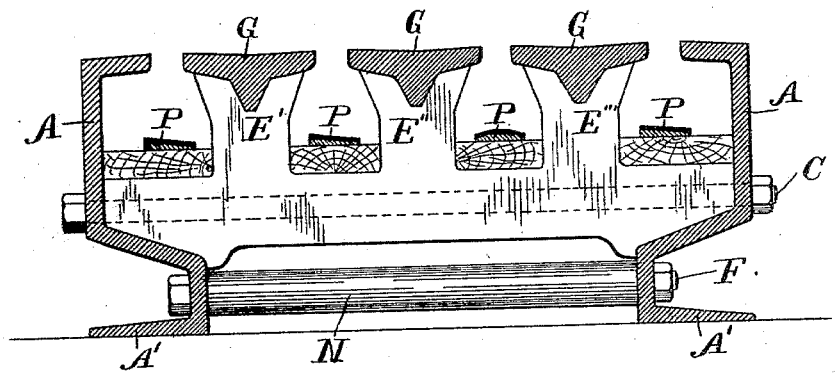
Figure 4:
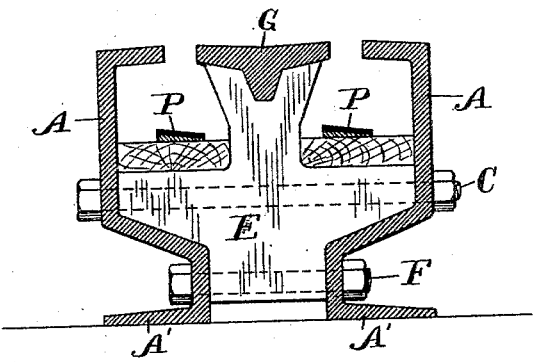

In the drawings, Figure 1 is a cross-section of the conduit located between two tracks. Fig. 2 is a longitudinal section. Fig. 3 is a cross-section, of modified form, of Fig. 1, arranged for return-circuits, or two roads using same track with independent currents. Fig. 4 is a cross-section showing different forms and arrangement of bolts and brackets.

In Fig. 1, A A represent side walls of my conduit, which may be cast or rolled in a solid piece of metal. Each is provided with a base A', which preferably rests upon a firm body of concrete or cement. The walls A A are made in a solid piece with the bases A' A'. Between the bodies of concrete or cement which support the bases A' A' an open space is left, (illustrated at B, Fig. 1,) extending, preferably, downward to the soil, forming a receptacle or reservoir into which will fall whatever trash or other substances enter through the slot and which affords drainage for the water. Additional drainage will also be secured by placing at intervals basins or suitable pipes B', Fig. 2, which may be connected to sewage system.

The two side walls A A are provided with bolts C and F, and over these bolts or around them, in Fig. 1, are shields D and N. They may either be open on one side or closed on all four sides, as indicated in Fig. 2. The shields D are angular in form and inclose the bolts C. In Fig. 4 the bolts C and F pass through the bracket E.

The side walls A A being put in place upon the properly-prepared body resting upon the flanges A' A', the bolt C is passed through the two walls, and around it (in using the shields) is the angular sleeve or shield D, and the nut on the bolt C is turned until the side walls A A come rigidly and firmly in contact with the ends of the shield D. A shield is also placed around the bolt F. The length of these shields D and N regulates the breadth of the conduit. If it is desired to make the conduit wider, longer shields are used, and vice versa. In using the bracket E, Fig. 4, directly upon the bolts or having the bolts pass directly through the bracket the method of construction of conduit is similar. The bolts C and F are passed through the side wall and the proper or corresponding holes in bracket, and the nuts on bolts C and F are turned until the side walls A A come rigidly and firmly in contact with ends of the bracket E. In the use of the bracket the length of same regulates the width of conduit. The use of either of these devices serves to brace firmly and rigidly the walls of the conduit and hold the two walls of the conduit together with a firmness and rigidity and strength greater than if the whole conduit were made in a single piece. The conduit remains open from top to bottom, except at the points where these bolts and the supporting-brackets E cross it.

In Fig. 1 in the form of conduit I have been describing it is intended to provide conductors for two separate and distinct currents of electricity and the conduit is placed between two parallel tracks, so that the cars on both will receive their supply from the some conduit, but from separate conductors. Resting upon the inclined portions of the wall A A, one leg on each, are placed at suitable intervals brackets E, Fig. 1, (with the use of shields upon the bolts C.) These brackets are preferably made with four legs and are made to fit upon and over the shields D. Without the use of the shields and with bolts passing through bracket E, as in Fig. 4, the bracket rests upon inclined sides of A A and continues down to nearly the bottom of A'

A'. The brackets, with or without the use of shields, serve as additional braces for giving rigidity to the whole structure. These brackets E are provided at their top with a longitudinal slot or groove to receive a bead upon the bottom of the plate G. This plate extending over the center of the conduit is of such a width as to leave suitable slots $g$ on either side. It is slightly concave on top, and its bottom is made to correspond with and dovetail into the tops of the bracket E. It is held firmly and securely in place by its own weight or, if desired, may be fastened with suitable bolts. This plate G is made in sections of any suitable or convenient length and is readily lifted off its seat, thereby opening the interior of the conduit for repairs, cleaning, or any other purpose. The plate G is provided at convenient intervals with openings S, Fig. 2, for drainage, and these openings may, if desired, be connected with tubes carrying water down to B, Fig. 2, and plate G may be provided with ground connection by way of these tubes if this be found necessary. On either side of the bracket E and resting upon it or the bolts (or shields D) are arranged longitudinal supports, preferably of wood, which carry the conductors.

In Fig. 1 I have shown two forms of conductor, one an inverted trough giving a round convex surface, which of course sheds water or dirt and is readily kept clean, also a simple inclined surface.

When it is necessary to provide a conductor for a return-circuit, as in the double-trolley system, or for two currents for two roads or companies using the parallel tracks, each with their individual or independent current, the conduit may be made wider and the brackets have three upright supports or arms E' E'' E''', as shown in Fig. 3, carrying covering-plates G G G, and thus providing four slots and four conductors. The arrangement of the conduit between the parallel tracks not only permits the ready and convenient supply of the electric currents to both lines of cars, but it is placed in the highest and cleanest part of the street, at the crown, where it is least liable to interfere with traffic and where it is least liable to accumulation of water or dirt.

The construction of my conduit with two halves in the form described and bolted together with the shields D and N or with bolt and bracket enable me to produce a conduit that is inexpensive, simple, and easy to put in place and is very rigid, and by simple changes in the lengths of the shields D or bracket E can be adjusted to any desired width.

Having thus described my invention, what I claim, and desire to secure by Letters Patent, is—

A subsurface conduit for carrying electric conductors for railway use, consisting of two side walls bolted together, brackets limiting the width of the conduit and supporting the surface plates G G, substantially as described.

CYRUS V. OSBORN.

Witnesses:
GEORGE HEIDMAN,
ALFRED M. ALLEN.